United States Patent Office 3,225,089
Patented Dec. 21, 1965

3,225,089
IMPROVEMENT IN THE CARBONATION OF
ALKALI METAL-CONTAINING POLYMERS
James N. Short, Bartlesville, Okla., assignor to Phillips
Petroleum Company, a corporation of Delaware
No Drawing. Filed Aug. 18, 1960, Ser. No. 50,310
6 Claims. (Cl. 260—537)

This application is a continuation-in-part of copending application Serial No. 772,167 of Uraneck, Short, and Zelinski, filed November 6, 1958, and now issued as U.S. Patent 3,135,716.

This invention relates to a method of carbonating polymers containing terminal alkali metal atoms.

It has been disclosed in the above mentioned copending application that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. In this manner, for example, a polymer can be obtained which has reactive carboxy groups attached to each end of the polymer molecule. Such a polymer can then be reacted with any one of several reagents which react with the carboxy groups to couple the molecules or to tie the end portions of the molecule into a polymer network which is formed by crosslinking. The utilization of these reactive terminal substituents on the polymer molecule enables substantially more effective cures since all of the molecule can be tied into the crosslinked structure. Also by simple coupling arrangements alone or with auxiliary curing liquid polymers can be readily converted into solids and soft, tacky rubber can be made quite rigid.

The term "telechelic" has been coined to define these terminally reactive polymers. As used in this specification and in the claims, telechelic polymers means polymers of vinylidene-containing monomers which contain a reactive group on each end of the polymer molecule. Such polymers can be prepared by various methods including polymerization of vinylidene-containing monomers in the presence of an organo alkali metal catalyst. This invention is concerned only with those telechelic polymers which contain terminal carboxy groups, to be designated as "carboxy-telechelic" polymers.

Once the alkali metal telechelic polymer is formed there are a number of ways by which the terminal alkali metal atoms can be replaced with carboxy groups. Some methods of carbonating such polymers involve contacting a solution of the polymer with carbon dioxide, either by bubbling carbon dioxide through the solution or by pouring the solution over Dry Ice. An alkali metal salt of the carboxy-telechelic polymer forms and the alkali metal can be removed by reacting the salt with acid. Unwanted side reactions are minimized if the temperature is kept low.

While these methods of carbonating the alkali metal telechelic polymer are operable they are not completely satisfactory because of the tendency for gel formation. When gel forms during these procedures the reaction efficiency is decreased so that the carboxy content of the end product is substantially reduced. My invention involves an improved method of carbonating alkali metal telechelic polymers so that gel formation is not a serious problem.

According to my invention a solution of polymer having at least one terminal alkali metal atom is contacted with gaseous carbon dioxide under conditions of turbulent flow whereby there occurs instantaneous mixing between said carbon dioxide and the polymer solution. The resulting product is then treated to remove the alkali metal atoms from the polymer and leave the carboxy end groups. Preferably the conditions of turbulent flow and intimate mixing are provided by passing the polymer solution and the gaseous carbon dioxide into separate legs of a T-shaped reaction tube and withdrawing the carbonated polymer mixture through the third leg of said tube.

It is an object of my invention to provide an improved method for carbonating polymers containing terminal alkali metal groups.

Another object of my invention is to provide a method of carbonating alkali metal telechelic polymers with increased efficiency to obtain polymers of high terminal carboxy content.

Another object is to provide a method of carbonating alkali metal telechelic polymers with a minimum of coupling and side reactions.

Still another object is to provide a practical continuous method of carbonating alkali metal telechelic polymers.

Other objects, advantages and features of my invention will be apparent to those skilled in the art from the following discussion.

The polymers which are carbonated by my invention are polymers of vinylidene-containing monomers. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. In addition to the conjugated dienes, other monomers which can be employed are aryl-substituted olefins, such as styrene, various alkyl styrenes, such as vinyltoluene, paramethoxystyrene, vinylnapththalene, and the like; heterocyclic nitrogen-containing monomers, such as pyridine and quinoline derivatives containing at least 1 vinyl or alpha-methylvinyl group, such as 2-vinylpyridine, 3-vinylpyridine, 4-vinylpyridine, 2-ethyl-5-vinylpyridine, 2-methyl-5-vinylpyridine, 3,5-diethyl-4-vinylpyridine, etc.; similar mono- and disubstituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers and copolymers of the above materials also include block copolymers, which are formed by polymerizing a monomer onto the end of a polymer, the monomer being introduced in such a manner that substantially all of the coreacting molecules enter the polymer chain at this point. In general, the block copolymers can include combinations of homopolymers and copolymers of the materials hereinbefore set forth.

The polymers used in my invention are prepared by contacting the monomer with an organo alkali metal compound. While compounds containing only one alkali metal atom per molecule, such as n-butyllithium are suitable and will produce mono-terminally reactive polymer, that is polymer containing a reactive group on only one end of the polymer chain, it is preferred that an organo polyalkali metal compound be employed, for example, containing 2 to 4 alkali metal atoms. Initiators containing 2 alkali metal atoms are more frequently employed, and, as will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal atoms being attached at each end of the polymer chain. The polymers in general will be linear polymers having two ends; however, polymers containing more than two ends can be prepared. The general reaction can be illustrated graphically as follows:

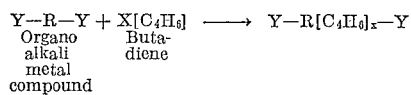

or

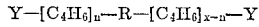

or combination thereof.

A specific example is:

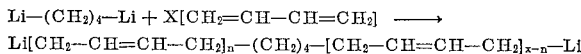

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive polymer, that is, polymer having alkali metal at only one end of the chain is substantially higher. The alkali metals, of course, include sodium, potassium, lithium, rubidium and cesium. The organic radical of the organo polyalkali metal compound can be an aliphatic, cycloaliphatic or aromatic radical. For example, di- and polyalkali metal substituted hydrocarbons can be employed including 1,4-dilithiobutane,
1,5-dipotassiopentane,
1,4-disodio-2-methylbutane,
1,6-dilithiohexane,
1,10-dilithiodecane,
1,15-dipotassiopentadecane,
1,20-dilithioeicosane,
1,4-disodio-2-butene,
1,4-dilithio-2-methyl-2-butene,
1,4-dilithio-2-butene,
1,4-dipotassio-2-butene,
dilithionaphthalene,
disodionaphthalene,
4,4'-dilithiobiphenyl,
disodiophenanthrene,
dilithioanthracene,
1,2-dilithio-1,1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2,4-disodioethylcyclohexane,
3,5-dipotassio-n-butylcyclohexane,
1,3,5-trilithiocyclohexane,
1-lithio-4-(2-lithio-4-methylphenyl)butane,
1,2-dipotassio-3-phenylpropane,
1,2-di(4-lithiobutyl)benzene,
1,3-dilithio-4-ethylbenzene,
1,4-dirubidiobutane,
1,8-dicesiooctane,
1,5,12-trilithiododecane,
1,4,7-trisodioheptane,
1,4-di(1,2-dilithio-2-phenylethyl)benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne,
1,11-dirubidio-5-hendecyne,
1,2-disodio-1,2-diphenylethane,
dilithiophenanthrene,
1,2-dilithiotriphenylethane,
dilithiomethane,
1,4-dilithio-1,1,4,4-tetraphenylbutane,
1,4-dilithio-1,4-diphenyl-1,4-dinaphthylbutane, and the like.

While the organo dialkali metal initiators in general can be employed, certain specific initiators give better results than others and are preferred in carrying out the preparation of the terminally reactive polymers. For example, of the condensed ring aromatic compounds, the lithium adducts of naphthalene, methylnaphthalenes, or anthracene are preferred, but the adducts of lithium and biphenyl can be employed with good results. Of the compounds of alkali metals with polyaryl-substituted ethylenes, the preferred material is 1,2-dilithio-1,2-diphenylethane (lithium-stilbene adduct). In many instances, the compounds which are formed are mixtures of mono- and dialkali metal compounds, which are less effective in promoting the formation of the terminally reactive polymers. The organo dialkali metal compounds, which have been set forth as being preferred, are those which when prepared contain a minimum of the mono-alkali metal compound. Another preferred initiator which provides several advantages is the dilithium adduct of 2,3-dimethyl-1,3-butadiene which contains 1 to 7 dimethylbutadiene units.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 1000 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds.

The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperature.

The polymer thus formed is in solution in one of the above-mentioned solvents. This solution can be reacted directly with carbon dioxide according to my invention. It is sometimes desirable to dilute or concentrate the solution in order to obtain the best viscosity conditions for the carbonation step. The most desirable polymer concentration depends upon the molecular weight of the polymer and the type of polymer and can readily be determined. Extremely dilute solutions can be treated but practical considerations concerning the handling of large quantities of solutions make it desirable to use solutions containing at least about 3 weight percent polymer. As explained above the molecular weight of the polymer can range from 1000 to 150,000 or higher although usually liquid polymers having molecular weights less than 20,000 are employed. The concentration of the polymer in solution ordinarily is not over 20 weight percent. Polymers of higher molecular weight are employed in the more dilute concentrations so that the viscosity of the solution is such that it can easily be passed through the mixing T. Mixing T's of various sizes can be used to accommodate the polymer solution of the viscosity available and solutions having viscosities up to 1200 or higher centipoises at 20° C. can be handled. While viscosity of the polymer solution can vary over a broad range, a viscosity of about 750 centipoises at 77° F. has been found quite satisfactory. Preferably the polymer concentration in the solution processed according to this invention is about 8 to 12 weigh percent.

The polymer is carbonated by introducing a stream of polymer solution and a separate stream of gaseous carbon dioxide into a confined zone of turbulence where the solution and the carbon dioxide are brought into immediate and intimate contact. The type of mixing zone in which the required turbulent contact can be obtained is a flow mixer. Examples of this type of mixer are jet mixers, orifice mixers, injector mixers and centrifugal pumps. Preferably the mixing zone is a simple mixing T either of the direct entry or the aspirator type.

When a body of polymer solution is treated with carbon dioxide or poured over Dry Ice the solution is changed into a thick, gelatinous mass which is quite difficult to stir. Intimate contact of the reactants is not obtained and the degree of carbonation is frequently lower than desired. It was quite unexpected, therefore, that the starting materials which produce such a gelatinous product could be fed into a confined zone which as a mixing T and immediately removed with improved results. In fact, a short residence time for the materials in the mixing zone is desirable. The reaction mixture should be withdrawn from the zone of turbulence within about 5 seconds after the initial contacting and preferably the residence time of polymer in the mixer is less than about 2 seconds.

The carbon dioxide should be used in substantial excess, for example, at least twice the amount required for stoichiometric carbonation of the polymer. The stoichiometric amount is one gram mole of carbon dioxide per gram atom of lithium in the initiator charged to the polymerization. Ordinarily the excess of carbon dioxide is about 5 to 50 times the amount required for carbonation because the gaseous carbon dioxide serves the additional purposes of creating turbulence in the mixing T, sweeping the mixture out of the T in a short time and cooling the reaction by expansion. The carbon dioxide is introduced under pressure, for example, about 10 to 100 p.s.i.g; and the mixing T is vented to a lower pressure, preferably to the atmosphere. Also, since moisture causes the alkali metal on the polymer ends to be replaced with hydrogen, the carbon dioxide should be dry. Otherwise, the reaction of some of the molecules is terminated before carbonation can occur and the yield of carbonated product is correspondingly decreased.

The temperature of the reaction should be maintained below °60 F. and preferably at about 30° F. or below. This temperature is best obtained by cooling the solution to about $-60°$ to $60°$ F. and preferably below 45° F. before introducing it into the mixing T. The additional cooling will generally be supplied by expansion of the excess carbon dioxide gas although auxiliary external cooling can be supplied if desired.

Since the alkali metal salt of the carboxy-telechelic polymer is normally insoluble in the polymerization diluent the carbonated polymer mixture issues from the downstream leg of the mixing T in the form of a dispersion of very finely divided gel, having the appearance of snow. This dispersion can be easily handled by pumps and can be transferred through piping to storage facilities.

The final step in preparing the carboxy-telechelic polymer is to treat the alkali metal salt with a suitable reagent, such as an acid, to convert the metal salt groups to carboxy groups. Any material containing an active hydrogen more reactive than the hydrogen of the carboxy group can be used for this replacement. Generally a dilute inorganic acid such as hydrochloric, phosphoric or sulfuric acid is most suitable.

The acid conversion step can follow the carbonation step immediately or it can be delayed several hours, storing the polymer meanwhile in its salt form. After acidification the polymer redissolves and is separated from the organic solvent by conventional techniques. The carboxy-telechelic polymer thus formed can be coupled by reacting with such reagents as tri(2-methyl-1-aziridinyl)-phosphine oxide used in about stoichiometric amounts although an excess of stoichiometric is preferred. Auxiliary curatives such as benzoyl peroxide can be used. The polymer can be compounded with its coupling and curing agents in a conventional manner using a roll mill or a Banbury mixer. Fillers such as carbon black or minerals can be incorporated in the mixture if desired. Curing can be effected at about 200 to 500° F., generally for about 20 to 150 minutes. The products can be used as adhesives, potting compounds, sealants, tread stocks and for many types of molded objects. Since the polymers which contain terminal acidic groups adhere to metal surfaces, partially reacted polymers are valuable in the production of laminates in which one or more of the plies are metal. Advantages of this invention are illustrated by the following examples. The reactants, and their proportions, and other specific conditions are presented as being typical and should not be construed to limit the invention unduly.

*Example 1*

1,3-butadiene was polymerized in accordance with the following recipe:

| | Parts by weight |
|---|---|
| 1,3-butadiene | 100 |
| Toluene | 860 |
| 1,2-dilithio-1,2-diphenylethane | [1] 5.82 |

[1] 30 mmoles.

| | |
|---|---|
| Temperature, ° F. | 122 |
| Time, hours | 1 |

Three runs were made. Polymerization was effected in 12-ounce bottles. Toluene was charged first after which the bottles were purged with prepurified nitrogen for 5 minutes at the rate of 3 liters per minute. Butadiene was introduced followed by the 1,2-dilithio-1,2-diphenylethane.

The initiator employed in the foregoing polymerizations was prepared in accordance with the following recipe:

| | |
|---|---:|
| Diethyl ether, ml. | 130 |
| Tetrahydrofuran, ml. | 70 |
| Trans-stilbene (1,2-diphenylethylene), moles | 0.4 |
| Lithium wire, gram atoms | 1.2 |
| Temperature, °F. | 122 |
| Time, hours | 1 |

Concentration of the solution was 0.2 molar.

Immediately following the polymerization, each unquenched reaction mixture was carbonated using a different technique. In the first run, a ¼ inch I.D. T-tube was used. Carbon dioxide, under a pressure of 15–18 p.s.i.g., and the polymer solution were fed into separate arms of the tube where they were mixed. An instantaneous reaction occurred upon contact of carbon dioxide with the lithium-containing polymers. The reaction mixture was transferred to an open vessel through the third arm of the tube. The polymer solution was transferred from the polymerization bottle into the T-tube by nitrogen under a pressure of 20 p.s.i.g. The carbonated polymer was in the form of a very finely divided gel which had the appearance of snow. Following carbonation, an excess of dilute hydrochloric acid was added to the lithium salt to free carboxy end groups. The aqueous and organic phases were separated and toluene was removed from the carboxy-containing polymer by placing it in a vacuum oven at 50° C.

Carbonation in the second run was effected by passing carbon dioxide into the unquenched polymer solution at room temperature. The bottle containing the polymer solution was inverted and shaken while carbon dioxide was introduced through a hypodermic needle until pressure in the bottle reached 20 p.s.i.g. A thick gel was formed. The bottle was opened and dilute hydrochloric acid was added. The mixture fluidized immediately upon addition of the acid. The carboxy-containing polymer was recovered as in the first run.

The third method of carbonation involved pouring the unquenched polymer solution over Dry Ice in an open container while the mixture was stirred. The vessel was blanketed with carbon dioxide gas supplied from a cylinder. A thick gel formed. Dilute hydrochloric acid was added and the product was recovered as in the first two runs.

The carboxy-containing polymers were liquids. Brookfield viscosity was determined at 25° C. on each of the dried products and also the viscosity of a 50 weight percent solution of each polymer in toluene was determined at 25° C. The products were analyzed for carboxy content. Results were as follows:

| Run No. | Carbonation Method | Brookfield Viscosity, Poises | Viscosity of 50% Solution, Centistokes | COOH, Percent |
|---|---|---:|---:|---:|
| 1 | T-tube | 1,162 | 62.1 | 1.27 |
| 2 | CO₂ injection | 2,064 | 75.4 | 0.55 |
| 3 | Dry Ice | 1,520 | 73.0 | 0.94 |

These data show that the T-tube technique gave the highest carboxy content and the product had the lowest viscosity which indicates that there was less tendency toward coupling than there was in runs 2 and 3.

*Example II*

Butadiene was polymerized at 50° C. to quantitative conversion in one hour. The following recipe was employed:

| | |
|---|---:|
| 1,3-butadiene, parts by weight | 100 |
| Cyclohexane, parts by weight | 780 |
| 1,2-dilithio-1,2-diphenylethane, millimoles | 50.0 |

Polymerization was effected in a one-gallon reactor. Cyclohexane was charged first after which the reactor was purged with prepurified nitrogen for 30 minutes at the rate of 3 cu. ft./hour. 1,2-dilithio-1,2-diphenylethane was added, the mixture was heated to 50° C., and butadiene was pressured in at 16 ml./minute. The temperature was controlled at 50° C. After one hour the reaction mixture was carbonated using the T-tube technique described in Example I. Eighteen milliliters of concentrated hydrochloric acid in a small quantity of solvent was added to the carbonated material after which it was washed six times with water and dried in a vacuum oven. Analysis of the product gave the following results:

| | | |
|---|---|---:|
| Inherent viscosity | | 0.18 |
| Ash | weight percent | 0.03 |
| Gel | do | 0 |
| COOH | do | 1.57 |

No difficulties were encountered using the foregoing instantaneous mixing procedure. When carbonation is effected by pouring the polymer solution over crushed Dry Ice, the cyclohexane freezes and makes carbonation difficult. Furthermore, mixing is made difficult on account of the insolubility of the lithium salt of the carbonated polymer in cyclohexane. The polymer solution is changed to a gelatinous mass which is difficult to stir.

As shown by the above data, a polymer high in terminal carboxy content can be obtained by the method of my invention without the formation of troublesome gel. This polymer product can be molded into castings either with or without substantial amounts of filler by curing the polymer in the mold and coupling the reactive carboxy end groups with a suitable coupling agent as previously described.

*Example III*

A polymerization initiator, an adduct of lithium with trans-stilbene (1,2-dilithio-1,2-diphenylethane), was prepared in a 50-gallon glass-lined tank equipped with an agitator. The recipe for preparing this adduct was as follows:

| | Parts by weight |
|---|---:|
| Trans-stilbene (1,2-diphenylethylene) | 100 |
| Lithium shot | ¹ 7.8 |
| Diethyl ether | 1185 |
| Tetrahydrofuran | 165 |

¹ 50% excess added.

The diethyl ether, tetrahydrofuran, and stilbene were charged, lithium was added, and the suspension was heated to 120° F. with agitation for one hour and then cooled to room temperature.

Polymerizations were carried out in an 80-gallon reactor in accordance with the following recipe:

| | |
|---|---:|
| 1,3-butadiene, parts by weight | 100 |
| Toluene, parts by weight | 1000 |
| 1,2 - dilithio - 1,2 - diphenylethane, parts by weight | Variable |
| Polymerization temperature, °F. | 122 |
| Time, hours | 1.0 |
| Conversion, percent | 100 |
| Charge order: Toluene, heat to polymerization temperature, butadiene, initiator. | |

When 100 percent conversion was reached, the polymerization mixture was cooled to carbonation temperature and carbonation effected using as a T a Model A, 1-inch Pownell heater manufactured by the Pownell Products Company, 205 West Alexis Road, Toledo 12, Ohio. This T is a standard model designed for heating water with steam by injecting steam through a ½-inch brass nozzle into the water which is passed through the annular space in the T. For carbonating polymer solutions $CO_2$ gas was injected through the nozzle into the polymer solution flowing through the annular space in the T. Polymer solution was supplied directly from the reactor to the T under pressure (70 to 80 p.s.i.g.) and the carbonated solution was discharged into a tank which was under vacuum (15″ Hg). $CO_2$ was supplied to the T at about 40 p.s.i.g. after passage over activated alumina for removal of water.

The polymer solution contained 9 percent polymer and the solution flow rate to the T averaged 3.92 gallons per minute. The $CO_2$ was added at a steady rate in each run in substantial excess over that required for carbonation. The contact time for the $CO_2$ and polymer solution in the mixing T was about 1.1 seconds.

Following carbonation each run was acidified with anhydrous HCl. Before addition of anhydrous HCl, 0.25 part by weight per 100 parts polymer of the antioxidant, phenyl-beta-naphthylamine, was added. Treatment of the carbonated polymer solution was effected by passing anhydrous HCl into the solution, in the presence of methyl violet, until it was slightly acid. Hydrogen chloride addition in increments over about a one-hour period was necessary for complete reaction. A small quantity of carbonated solution was then added until most of the excess HCl was reacted. The treated polymer solution was filtered through diatomaceous earth (Dicalite) to remove excess HCl and lithium chloride, an additional 0.75 part by weight per 100 parts polymer of phenyl-beta-naphthylamine was added, and the solvent was removed.

A summary of six runs is given in the following table:

| Run No. | Polymerization—Lithium-Stilbene Adduct | | Carbonation | | | Product, COOH, Percent |
|---|---|---|---|---|---|---|
| | Parts | Mmoles | Solution Temp., °F. | Total Time, Min. | $CO_2$ Used Pounds | |
| 1 | 4.08 | 21 | 20 | 60 | 33 | 1.22 |
| 2 | 4.08 | 21 | 32 | 30 | 33 | 1.28 |
| 3 | 4.08 | 21 | 35 | 33 | 37 | 1.25 |
| 4 | 4.08 | 21 | 36 | 35 | 37 | 1.25 |
| 5 | 4.28 | 22.1 | 40 | 35 | 33 | 1.48 |
| 6 | 4.08 | 21 | 42 | 21 | 31 | 1.36 |

The above data show that excellent carbonation efficiencies are obtained by the method of my invention.

While certain embodiments of the invention have been described for illustrative purposes, the invention obviously is not limited thereto.

I claim:

1. In a process for carbonating a polymer of a vinylidene-containing monomer selected from the group consisting of conjugated dienes and aryl-substituted olefins, said polymer having a molecular weight in the range of about 1000 to 150,000 and containing at least one terminal alkali metal atom per molecule, the improvement which comprises introducing dry gaseous carbon dioxide in an amount at least twice that required for stoichiometric carbonation of said polymer and under pressure into a flowing polymer solution containing not over 20 weight percent of said polymer passing through a mixing zone, maintaining the pressure within said zone below said pressure of the carbon dioxide added so that expansion of said carbon dioxide occurs within said zone producing cooling and turbulent mixing of said solution and carbon dioxide, thus maintaining the temperature of the reaction mixture below 60° F. and withdrawing the resulting mixture from said zone within about 5 seconds.

2. In a process for carbonating a polymer of a vinylidene-containing monomer selected from the group consisting of conjugated dienes and aryl-substituted olefins, said polymer containing at least one terminal alkali metal atom per molecule and having a molecular weight of about 1000 to 20,000, the improvement which comprises flowing a stream of solution containing 3 to 20 weight percent of said polymer in a hydrocarbon solvent through a mixing zone, maintaining the temperature of said solution flowing to said zone in the range of −60 to 60° F., introducing dry carbon dioxide gas in an amount at least about twice that required for stoichiometric carbonation of said polymer and under a pressure of about 10 to 100 p.s.i.g. into said solution in said zone, maintaining the pressure within said zone below said gas pressure so that said carbon dioxide expands upon entering said zone producing cooling and turbulent mixing of said solution and carbon dioxide, and withdrawing the resulting mixture from said zone within about 5 seconds.

3. The method of claim 2 wherein said polymer is lithium-telechelic polybutadiene.

4. The process of claim 3 wherein said mixture on being withdrawn from said tube is reacted immediately with hydrogen chloride to convert the lithium salt of the polymer to polymer containing terminal carboxy groups.

5. The process of claim 2 wherein said carbon dioxide is fed to said tube in an amount about 2 to 50 times that required for stoichiometric carbonation of said polymer.

6. In a process for carbonating a lithium-telechelic polymer of 1,3-butadiene having a molecular weight of about 1000 to 10,000, the improvement which comprises feeding dry gaseous carbon dioxide in an amount at least about twice that required for stoichiometric carbonation of said polymer and under a pressure of about 10 to 100 p.s.i.g. into one leg of a T-shaped reaction tube, feeding a 3 to 20 weight percent solution of said polymer in a hydrocarbon solvent at a temperature below 45° F. into a second leg of said tube, maintaining the pressure in said tube not greater than about atmospheric whereby said carbon dioxide expands to cool said solution as it is brought into intimate turbulent contact therewith, removing the resulting mixture through the third leg of said tube within about 2 seconds of the initial contacting, and reacting said mixture with acid to replace the lithium atoms in the polymer with hydrogen atoms.

References Cited by the Examiner

UNITED STATES PATENTS

| 2,366,460 | 1/1945 | Semon | 260—94.7 |
| 2,631,175 | 3/1953 | Crouch | 260—94.2 |
| 2,816,918 | 12/1957 | Wynkoop et al. | 260—537 |
| 2,913,444 | 11/1959 | Diem | 260—94.2 |
| 3,012,000 | 12/1961 | Aries | 260—45.5 |
| 3,135,716 | 6/1964 | Uraneck et al. | 260—533 |

FOREIGN PATENTS 628,034  8/1949  Great Britain.

OTHER REFERENCES

Rochow et al.: "The Chemistry of Organometallic Compounds," page 70, John Wiley & Sons, Inc., New York, 1957.

LORRAINE A. WEINBERGER, *Primary Examiner.*

MARCUS LIEBMAN, CHARLES B. PARKER, LEON ZITVER, *Examiners.*